US009360678B2

(12) United States Patent
Wang et al.

(10) Patent No.: US 9,360,678 B2
(45) Date of Patent: Jun. 7, 2016

(54) LIGHT MODULATING MODULE AND IMAGE DISPLAY

(71) Applicant: DELTA ELECTRONICS, INC., Taoyuan Hsien (TW)

(72) Inventors: Yeong-Feng Wang, Taoyuan Hsien (TW); Ming-Wei Tsai, Taoyuan Hsien (TW); Keh-Su Chang, Taoyuan Hsien (TW); Rong-Chang Liang, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 291 days.

(21) Appl. No.: 13/856,286

(22) Filed: Apr. 3, 2013

(65) Prior Publication Data

US 2014/0300838 A1    Oct. 9, 2014

(51) Int. Cl.
G02F 1/1335 (2006.01)
G02B 27/26 (2006.01)
G02B 27/22 (2006.01)
G02F 1/29 (2006.01)

(52) U.S. Cl.
CPC ............ *G02B 27/26* (2013.01); *G02B 27/2214* (2013.01); *G02F 1/29* (2013.01); *G02F 2001/291* (2013.01)

(58) Field of Classification Search
None
See application file for complete search history.

(56) References Cited

U.S. PATENT DOCUMENTS

| 5,917,562 | A  | * | 6/1999  | Woodgate et al. | 349/15  |
| 6,151,089 | A  | * | 11/2000 | Yang et al.     | 349/113 |
| 6,243,150 | B1 | * | 6/2001  | Watanabe et al. | 349/65  |
| 2003/0016317 | A1 | * | 1/2003 | Kotchick et al. | 349/96  |
| 2006/0262250 | A1 | * | 11/2006 | Hobbs          | 349/96  |
| 2009/0102990 | A1 | * | 4/2009 | Walton et al.   | 349/15  |

* cited by examiner

*Primary Examiner* — Richard Kim
(74) *Attorney, Agent, or Firm* — Muncy, Geissler, Olds & Lowe, P.C.

(57) ABSTRACT

The disclosure provides a light modulating module attached on a display side of a reflective display apparatus, including: a light source portion capable of providing an illumination light beam, wherein the illumination light beam is capable of being transmitted to the reflective display apparatus, and the reflective display apparatus is adapted to reflect the illumination light beam to generate an image light beam; and an image light modulating device is disposed above the reflective display apparatus and disposed in a light path of the image light beam, wherein the image light modulating device is capable of modulating a direction and/or a polarization state of the image light beam, and the image light beam is emitted to either a left or right eye of a viewer to form an autostereoscopic image perceivable to the viewer after the image light beam passes through the image light modulating device.

30 Claims, 6 Drawing Sheets

LIGHT MODULATING MODULE AND IMAGE DISPLAY

BACKGROUND OF THE INVENTION

1. Field of the Invention

The disclosure relates to a 3D image display, and in particular relates to a light modulating module thereof.

2. Description of the Related Art

Displays capable of showing stereoscopic images or animations are called three-dimensional (3D) image displays. Major developments in the 3D display fields have led to two types of technologies: a polarized glasses type and a naked-eye type. Meanwhile, 3D display effects may also be theoretically accomplished by using holography. However, holography needs interference of several light beams to display 3D images.

In the conventional 3D image displays, whether the naked-eye type or the polarized glasses type, a light modulating module is fixed on a display apparatuses. A user cannot view 3D images by an original 2D image display. The only way to view 3D images is buy a new 3D image display. Accordingly, a moveable light modulating module capable of being attached on a 2D image display to perform 3D images is called-for.

BRIEF SUMMARY OF THE INVENTION

One embodiment of the disclosure provides a light modulating module, adapted to be attached on a display side of a reflective display apparatus, comprising: a light source portion capable of providing an illumination light beam, wherein the illumination light beam is capable of being transmitted to the reflective display apparatus, and the reflective display apparatus is adapted to reflect the illumination light beam to generate an image light beam; and an image light modulating device disposed above the reflective display apparatus and disposed in a light path of the image light beam, wherein the image light modulating device is capable of modulating a direction and/or a polarization state of the image light beam, wherein the image light beam is emitted to either a left or right eye of a viewer to form an autostereoscopic image perceivable to the viewer after the image light beam passes through the image light modulating device.

One embodiment of the disclosure provides a stereoscopic display module adapted to be applied to a reflective display apparatus, comprising: the described light modulating module; and a stereoscopic glasses comprising a right eye glass capable of transmitting the image light beam having a first polarization state and a left eye glass capable of transmitting the image light beam having a second polarization state, wherein the first polarization state is different from the second polarization state, wherein the image light beam is emitted to either a left or right eye of a viewer to form an auto stereoscopic image perceivable to the viewer after the image light beam is emitted out from the image light modulating device and passes through the stereoscopic glasses.

One embodiment of the disclosure provides an image display comprising: a reflective display apparatus, comprising a display panel having a plurality of pixels; and a light modulating module, disposed on the reflective display apparatus, comprising: a light source portion capable of providing an illumination light beam, wherein the illumination light beam is capable of being transmitted to the reflective display apparatus, and the reflective display apparatus is adapted to reflect the illumination light beam to generate an image light beam; and an image light modulating device disposed above the reflective display apparatus and disposed in a light path of the image light beam, wherein the image light modulating device is capable of modulating a direction and/or a polarization state of the image light beam, wherein the image light beam is emitted to either a left or right eye of a viewer to form an auto stereoscopic image perceivable to the viewer after the image light beam passes through the image light modulating device.

One embodiment of the disclosure provides an image display system, comprising: a reflective display apparatus, comprising a display panel having a plurality of pixels; and a light modulating module, disposed on the reflective display apparatus, comprising a light source portion capable of providing an illumination light beam, wherein the illumination light beam is capable of being transmitted to the reflective display apparatus, and the reflective display apparatus is adapted to reflect the illumination light beam to generate an image light beam; an image light modulating device disposed above the reflective display apparatus and disposed in a light path of the image light beam, wherein the image light modulating device is capable of modulating at least one of the direction and the polarity of the image light beam; and a stereoscopic glasses comprising a right eye glass capable of transmitting the image light beam having a first polarization state and a left eye glass capable of transmitting the image light beam having a second polarization state, wherein the first polarization state is different from the second polarization state, wherein the image light beam is emitted to either a left or right eye of a viewer to form an auto stereoscopic image perceivable to the viewer after the image light beam is emitted out from the image light modulating device and passes through the stereoscopic glasses.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
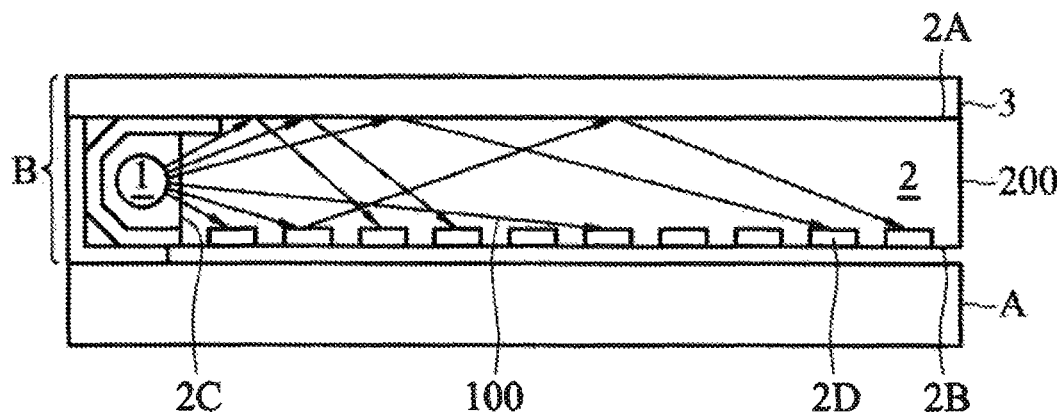
FIGS. 1-10 show image displays in embodiments of the disclosure.

FIG. 1 shows an image display of one embodiment in the disclosure. A light modulating module B is attached on a reflective display apparatus A including a display panel having a plurality of pixels. The reflective display can be an electrophoretic electronic ink display, a chlorestic liquid crystal display, or the likes. The light modulating module B includes a light source portion I and an image light modulating device such as a reflective polarizer 3. The light source portion I emits an illumination light beam 100 to be transmitted to the reflective display apparatus A and then reflected to generate an image light beam. A polarization state of the image light beam is then modulated by the reflective polarizer 3 in a light path of the image light beam, such that the image light beam is then emitted to either a left or right eye of a viewer to form an auto stereoscopic image for the viewer after the image light beam passes through the reflective polarizer 3.

In one embodiment, the light source portion includes a plane light source 200 disposed between the image light modulating device B and the reflective display apparatus A. The plane light source 200 may include a light emitting device 1 and a light guide device 2. The light emitting device 1 can be a light emitting diode (LED), a cold cathode fluorescent lamp (CCFL), a hot cathode fluorescent lamp (HCFL), an exterior electrode fluorescent lamp (EEFL), or the likes. The light guide device 2 includes an image light emitting surface 2A, an image light incident surface 2B opposite to the image light emitting surface 2A, and an illumination light incident surface 2C perpendicular to the image light incident surface 2B and the image light emitting surface 2A. As shown in FIG. 1, the light emitting device 1 is disposed adjacent to the illumination light incident surface 2C of the light guide device 2. As such, an illumination light beam 100 emitted by the light emitting device 1 travels through the illumination light incident surface 2C and the image light incident surface 2B, and then enters the reflective display apparatus A. The illumination light beam 100 is then reflected to generate an image light beam. The image light beam, traveling through the image light incident surface 2B and the image light emitting surface 2A, is then modulated by the reflective polarizer 3 to be emitted to either a left or right eye of a viewer to form an auto stereoscopic image for the viewer. In one embodiment, the light guide device 2 further includes a plurality of microstructures 2D disposed on the image light incident surface 2B. Furthermore, the microstructures 2D include a plurality of quantum dots having a distribution density increasing along a direction away from the illumination light incident surface. In other words, the quantum dots distribution near the top of the microstructures 2D is denser than that near the bottom of the microstructures 2D. The microstructures 2D and the quantum dots thereof may further enhance a uniformity of the image light beam distribution.

Figure 2:
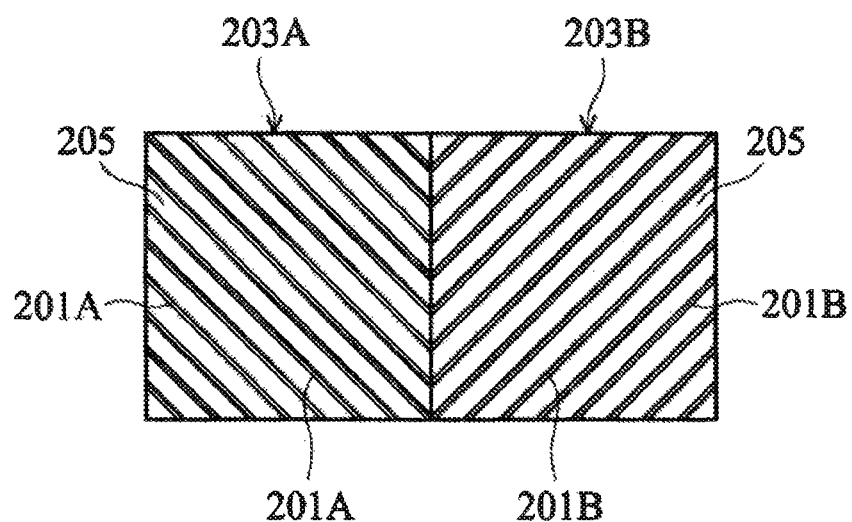

The reflective polarizer 3 can be a linear reflective polarizer or a circular reflective polarizer. In one embodiment, the reflective polarizer 3 includes a first portion and a second portion. The first portion substantially reflects the image light beam having a first polarization state and substantially transmits the image light beam having a second polarization state. The second portion substantially reflects the image light beam having the second polarization state and substantially transmits the image light beam having the first polarization state. The first polarization state is different from the second polarization state. In one embodiment, the reflective polarizer 3 can be a wire grid polarizer including a wire grid disposed on a substrate. As shown in FIG. 2, the wire grid includes a plurality of wires 201A aligned in parallel corresponding to a first direction in the first portion 203A, and a plurality of wires 201B aligned in parallel corresponding to a second direction in the second portion 203B, respectively. The wires 201A and 201B can be composed of an electrically conductive material, e.g. metal such as aluminum, silver, and gold. The wires 201A and 201B can be nano-sized wires separated by nano-scaled spaces 205. For example, the spaces 205 may have a width of 10 nm to 250 nm, and the ratio of the wires 201A and 201B to the spaces 205 is 25% to 75%. In another embodiment, the reflective polarizer 3 includes first and second portions of the multi-layered stack of alternating layers comprising a first material and a second material with different refractive indexes. The first portion of the multi-layered stack of alternating layers substantially reflects the image light beam having a first polarization state and substantially transmits the image light beam having a second polarization state. The second portion of the multi-layered stack of alternating layers substantially reflects the image light beam having a second polarization state and substantially transmits the image light beam having a first polarization state. The first polarization state is different from the second polarization state. For an example of the reflective polarizer 3, reference may be made to U.S. Pat. No. 5,122,905. When the reflective polarizer 3 is selected as the image light modulating device, a viewer should wear stereoscopic glasses including a right eye glass and a left eye glass. The right eye glass transmits the image light beam having the first polarization state, and the left eye glass transmits the image light beam having the second polarization state.

Figure 3:
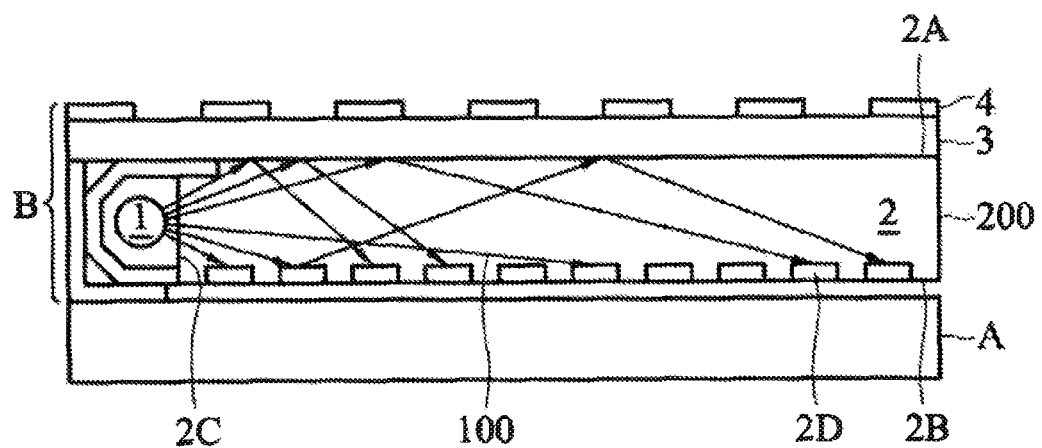
Figure 4:
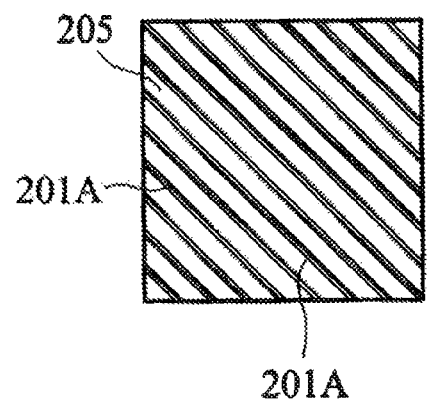

In one embodiment, the reflective polarizer 3 substantially reflects an image light beam having a first polarization state and substantially transmits an image light beam having a second polarization state. The first polarization state is different from the second polarization state. Still in this embodiment, the image light modulating device further includes a fractional wave plate 4 disposed on the reflective polarizer 3, as shown in FIG. 3. The fractional wave plate 4 includes a quarter wave plate or a half wave plate, such that half of the image light beam having the first polarization state is transferred to an image light beam having the second polarization state. In one embodiment, the reflective polarizer 3 can be a wire grid polarizer including a wire grid disposed on a substrate. As shown in FIG. 4, the wire grid includes a plurality of wires 201A aligned in parallel corresponding to a first direction in all portions. In another embodiment, the reflective polarizer 3 is a multi-layered stack of alternating layers comprising a first material and a second material with different refractive indexes. For an example of the reflective polarizer 3, reference may be made to U.S. Pat. No. 5,122,905. When the reflective polarizer 3 and the functional wave plate 4 are selected as the image light modulating device, a viewer should wear stereoscopic glasses including a right eye glass and a left eye glass. The right eye glass transmits the image light beam having the first polarization state, and the left eye glass transmits the image light beam having the second polarization state.

Figure 5:
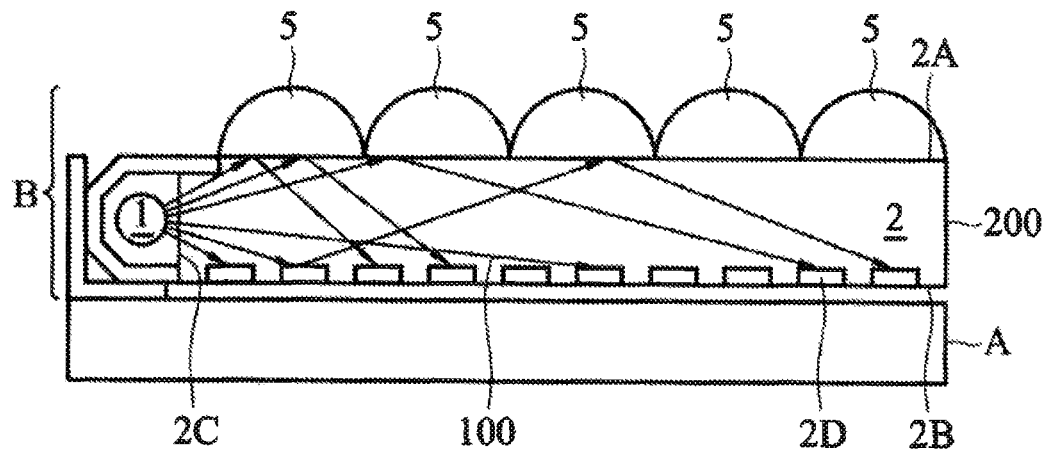
Figure 6:
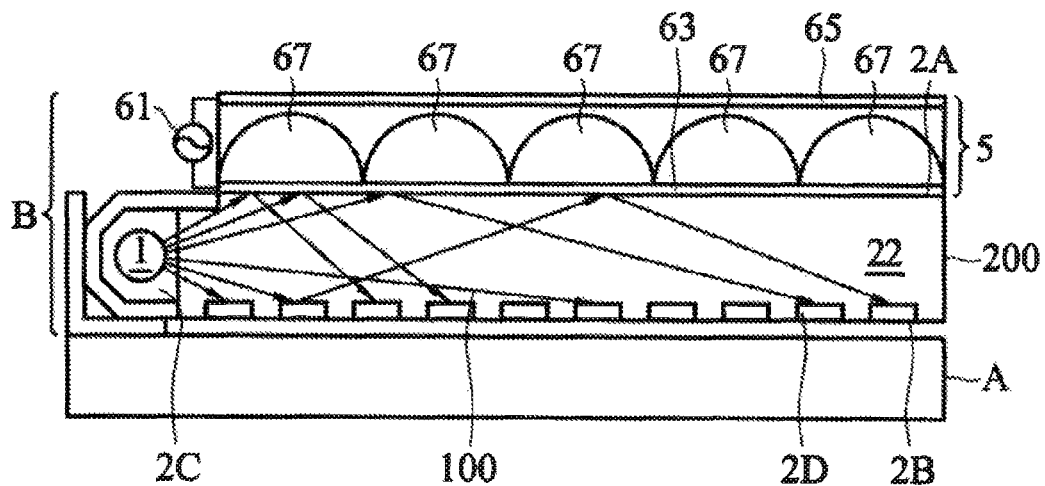

FIG. 5 shows an image display of one embodiment in the disclosure. A light modulating module B is attached on a reflective display apparatus A including a display panel having a plurality of pixels. The reflective display can be an electrophoretic electronic ink display, a chlorestic liquid crystal display, or the likes. The light modulating module B includes a light source portion I and an image light modulating device such as a light directing device 5. The light source portion I emits an illumination light beam 100 to be transmitted to the reflective display apparatus A and then reflected to generate an image light beam. A direction of the image light beam is then modulated by the light directing device 5 in a light path of the image light beam, such that the image light beam is then refracted to either a left or right eye of a viewer to form an auto stereoscopic image for the viewer after the image light beam passes through the light directing device 5. The light source portion is similar to the previously described embodiment and omitted here. The light directing device 5 can be a lenticular film having a plurality of microlenses, a plurality of prisms, or a plurality of cylinders, as shown in FIG. 5. In another embodiment, the light directing device 5 includes an adjusting unit 61, a first electrode 63, a second electrode 65, and a plurality of variable lenses 67 formed by a birefringence polar fluid, as shown in FIG. 6. The adjusting unit 61 adjusts a driver voltage from a driver source to the first electrode 63 and the second electrode 65, thereby modulating an arrangement of the birefringence polar fluid of the plurality of the variable lenses 67. As such, the direction of the image light beam is refracted to either a left or right eye of the viewer without wearing stereoscopic glasses. The birefringence polar fluid can be a liquid crystal element. In addition, the light directing device may further include an alignment layer (not shown) on the second electrode 65 to align the birefringence polar fluid of the variable lenses 67.

Figure 7:
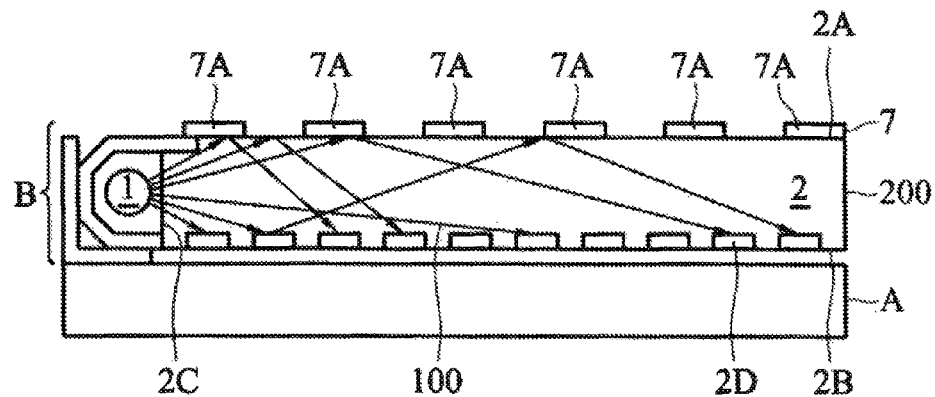
Figure 8:
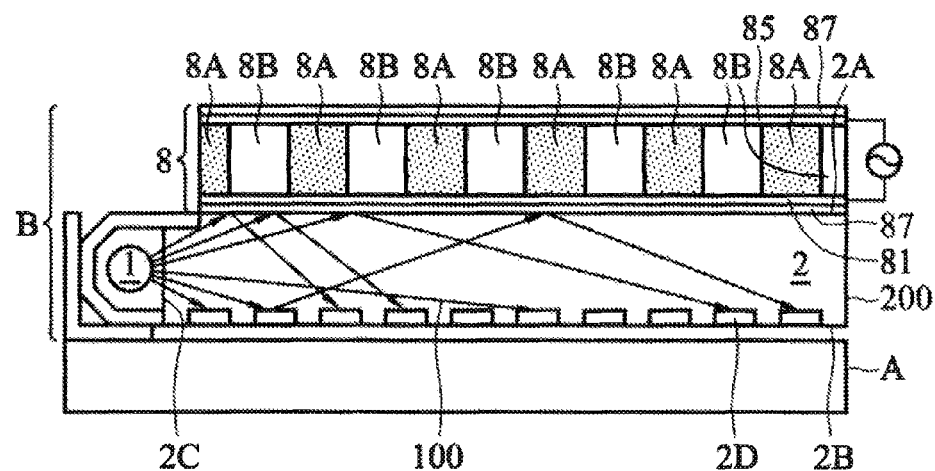

FIG. 7 shows an image display of one embodiment of the disclosure. A light modulating module B is attached on a reflective display apparatus A including a display panel having a plurality of pixels. The reflective display can be an electrophoretic electronic ink display, a chlorestic liquid crystal display, or the likes. The light modulating module B includes a light source portion I and an image light modulating device such as a 3D barrier layer 7. The light source portion I emits an illumination light beam 100 to be transmitted to the reflective display apparatus A and then reflected to generate an image light beam. A direction of the image light beam is then modulated by the 3D barrier layer 7 in a light path of the image light beam, such that the image light beam is then emitted to either a left or right eye of a viewer to form an auto stereoscopic image for the viewer after the image light beam passes through the 3D barrier layer 7. The 3D barrier layer 7 has light shielding portions 7A and light transmitting slits 7B, as shown in FIG. 7. The positions of the light shielding portions 7A and the light transmitting slits 7B are fixed in FIG. 7. In another embodiment, the positions of the light shielding portions 8A and the light transmitting slits 8B of the 3D barrier layer 8 are variable, as shown in FIG. 8. The 3D barrier layer 8 includes a bottom electrode 81, a top electrode 85, and a liquid crystal layer 83 disposed therebetween. While a voltage is applied to the liquid crystal layer 83, the light shielding portions 8A and the light transmitting slits 8B are formed. If the liquid crystal layer 83 is a bistable liquid crystal, the voltage can be re-zeroed to save energy after forming the light shielding portions 8A and the light transmitting slits 8B. In one embodiment, an additional polarizer layer 87 can be formed under the bottom electrode 81 and/or on the top electrode 85. Note that the viewer watching the image display including the 3D barrier layer may watch auto stereoscopic images without wearing stereoscopic glasses.

Figure 9:
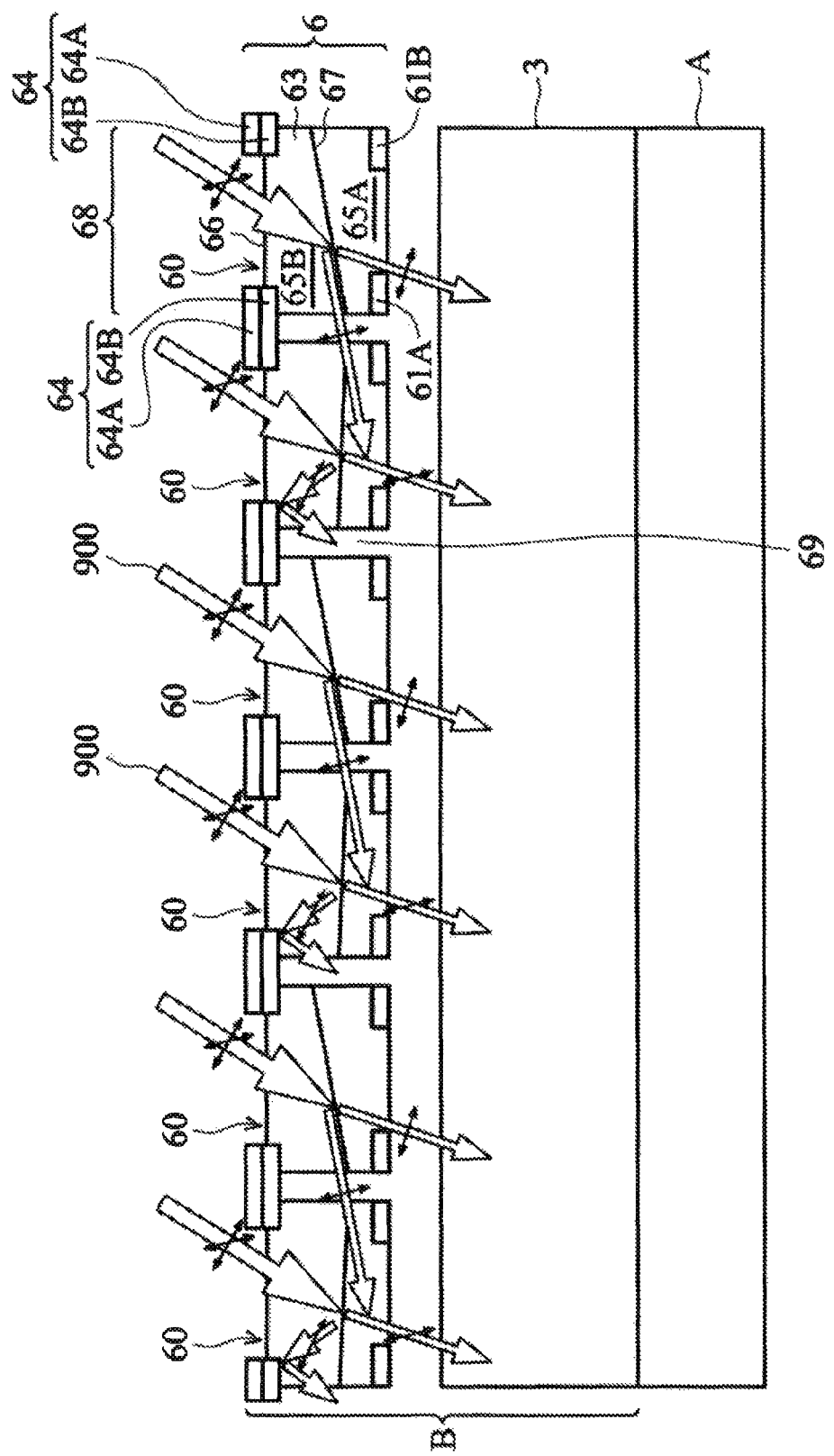

In one embodiment, a light source portion is disposed on the image light modulating device (such as an angular adjustable reflective polarizing device 6 on a reflective polarizer 3), as shown in FIG. 9. The image light modulating device is disposed between the light source portion and the reflective display apparatus A. The reflective polarizer 3 is similar to that in embodiments of FIGS. 1 and 2, having a first portion and second portion of wires arranged in different directions or of different reflective polarizers. The angular adjustable reflective polarizing device 6 has a plurality of the switchable light modulating cells 60. Each of the switchable light modulating cells 60 comprises a polarizer 67, a first electrode 61A, a second electrode 61B, a compartment 63, and a first and second light modulating media 65A and 65B filled in the compartment 63. The first light and second light modulating media 65A and 65B are substantially immiscible and are of different refractive indices. The polarizer 67 is on a boundary between the first light and second light modulating media 65A and 65B and is capable of being adjusted with a variation of the boundary between the first light and second light modulating media 65A and 65B driven by voltage difference among the first and second electrodes 61A and 61B. Reference may be made to U.S. application Ser. Nos. 13/221,321 and 13/016,384 for the positions of the first and second electrode, the cross-sectional shape of the compartment 63, and compositions of the first and second light modulating media 65A and 65B of FIG. 9, and are not limited thereto. The polarizer 67 can be a multilayer stack of alternating layers comprising a first material and a second material of different refractive indexes. The polarizer 67 reflects an image light beam (or an ambient light) having a first polarization state and substantially transmits an image light beam (or an ambient light) having a second polarization state. The first polarization state is different from the second polarization state. The reflected image light beam (having the first polarization state) will incident into another switchable light modulating cell 60. The compartment 63 of the switchable light modulating cell 60 includes a partition wall 69 disposed between two adjacent switchable light modulating cell 60. The light source portion 68 is disposed on the partition wall 69. The light source portion 68 includes a light transparent window, wherein the light transparent window comprises a light transparent portion 66 and a frame 64. The frame 64 includes an absorber 64A and a reflection portion 64B disposed between the absorber 64A and the partition wall 69. An ambient light 900 is capable of entering the switchable light modulating cell 60 by passing the light transparent portion 68 of the light transparent window. For a first set of switchable light modulating cell 60 (e.g. the rightmost one and the likes), the ambient light 900 having a second polarization state will travel through the polarizer 67 in the switchable light modulating cell 60 and the reflective polarizer 3 (the second portion) to enter and reflected by the reflective display apparatus A, thereby generating an image light beam. The image light beam having a second polarization state then travels through the reflective polarizer 3 (the second portion) and the polarizer 67 in the switchable light modulating cell 60 to enter either a left eye (or right eye) of a viewer wearing stereoscopic glasses. For the first set of switchable light modulating cells 60 (e.g. the leftmost one and the likes), the ambient light 900 having a first polarization state will be reflected by a polarizer 67 in the first set of the switchable light modulating cells 60, and then travels through the partition wall 69 to a second set of switchable light modulating cells 60. The reflected ambient light will travel through the reflective polarizer 3 (the first portion), and then enters and be reflected by the reflective display apparatus A corresponding to the second set of switchable light modulating cells 60, thereby generating an image light beam having the first polarization state. The image light beam having the first polarization state is then travel through the reflective polarizer 3 (the first portion) and the polarizer 67 in the second set of switchable light modulating cells 60 to enter either a left eye (or right eye) of a viewer wearing stereoscopic glasses. For the second set of switchable light modulating cells 60 (e.g. the leftmost one and the likes), the ambient light 900 having a first polarization state will travel through the polarizer 67 in the switchable light modulating cell 60 and the reflective polarizer 3 (the first portion) to enter and be reflected by the reflective display apparatus A, thereby generating an image light beam. The image light beam having the first polarization state then travels through the reflective polarizer 3 (the first portion) and the polarizer 67 in the switchable light modulating cell 60 to enter either a left eye (or right eye) of a viewer wearing stereoscopic glasses. For the second set of switchable light modulating cells 60 (e.g. the leftmost one and the likes), the ambient light 900 having a second polarization state will be reflected by a polarizer 67 in the second set of switchable light modulating cells 60, and then absorbed by the absorber 64A (or reflected by the reflection portion 64B to the first set of switchable light modulating cells 60). In this embodiment, no additional plane light source (such as a light emitting device and a light guide device) is disposed between the reflective display apparatus A and the image light modulating device. In other words, the ambient light 900 replaces the illumination light beam 100 in previously described embodiments.

Figure 10:
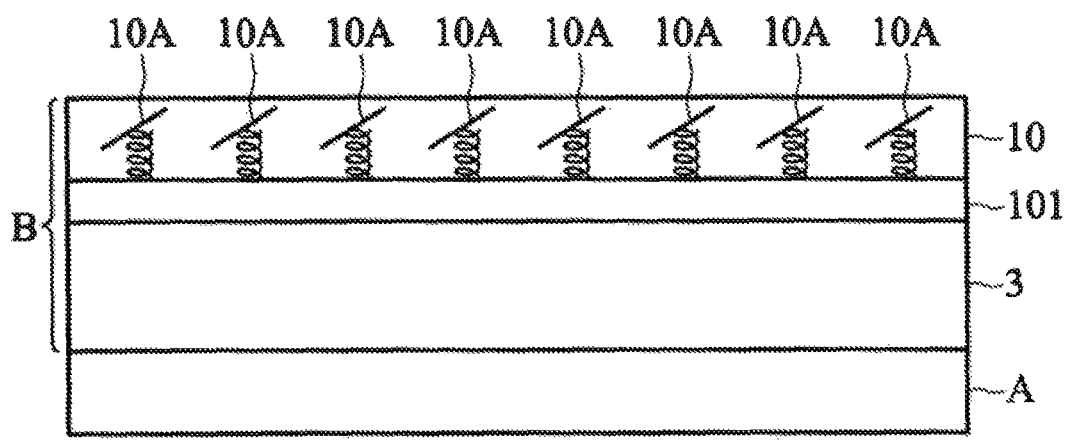

In one embodiment, a light source portion is disposed on the image light modulating device (such as a micro electro mechanical system (MEMS) device 10 on a transparent substrate 101 on the reflective polarizer 3), as shown in FIG. 10. The micro electro mechanical system device 10 includes a moveable optical element 10A and an actuator (not shown) to actuate the optical element 10A. The moveable optical element 10A is capable of being held at any one of a plurality of positions on the transparent substrate 101. For example, the moveable optical element 10A is a polarizer capable of substantially reflecting an image light beam (and an ambient light) having a first polarization state and substantially transmitting an image light beam (and an ambient light) having a second polarization state, wherein the first polarization state is different from the second polarization state. The motion (e.g. the polarizer position, the polarizer tilt angle, and the likes) of the polarizer is controlled by the actuator. The ambient light having a second polarization state will travel through the moveable optical element 10A and the reflective polarizer 3 to enter and be reflected by the reflective display apparatus A, thereby generating an image light beam. The image light beam having a second polarization state then travels through the reflective polarizer 3 and the moveable optical element 10A to enter either a left eye and right eye of a viewer wearing stereoscopic glasses. In this embodiment, no more plane light source (such as a light emitting device and a light guide device) is disposed between the reflective display apparatus A and the image light modulating device. In other words, the ambient light replaces the illumination light beam 100 in previously described embodiments.

Whether the light modulating module B includes, e.g. the light source portion I and the image light modulating device (such as a reflective polarizer 3) in FIG. 1, the light source portion I and the image light modulating device (such as a reflective polarizer 3 and a fractional wave plate 4 thereon) in FIG. 3, a light source portion I and an image light modulating device (such as a light directing device 5) in FIGS. 5 and 6, a light source portion I and an image light modulating device (such as a 3D barrier layer 7 or 8) in FIGS. 7 and 8, the light source portion on the image light modulating device (such as an angular adjustable reflective polarizing device 6 on a reflective polarizer 3) in FIG. 9, or the light source portion on the image light modulating device (such as the micro electro mechanical system (MEMS) device 10 on the transparent substrate 101 on the reflective polarizer 3) in FIG. 10, the light modulating module B is not fixed on the reflective display apparatus A. Note that the light modulating module B and the reflective display apparatus A can be separately made at different factories or even different countries, and then combined by a user to perform stereoscopic images. In addition, the reflective display apparatus A is input 3D image signals to display 3D images. The reflective display apparatus A cannot display 3D images by the input of 2D image signals, even if the light modulating module B is attached on the reflective display apparatus A.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light modulating module, adapted to be attached on a display side of a reflective display apparatus, comprising:
   a light source portion capable of providing an illumination light beam, wherein the illumination light beam is capable of being transmitted to the reflective display apparatus, and the reflective display apparatus is adapted to reflect the illumination light beam to generate an image light beam; and
   an image light modulating device disposed above the reflective display apparatus and disposed in a light path of the image light beam, wherein the image light modulating device is capable of modulating a direction and/or a polarization state of the image light beam,
   wherein the image light beam is emitted to either a left or right eye of a viewer to form an autostereoscopic image perceivable to the viewer after the image light beam passes through the image light modulating device,
   wherein the light source portion comprises a plane light source and is disposed between the image light modulating device and the reflective display apparatus.

2. The light modulating module of claim 1, wherein the plane light source comprises a light emitting device and a light guide device, wherein the light guide device comprises an image light emitting surface, an image light incident surface opposite to the image light emitting surface, and an illumination light incident surface perpendicular to the image light incident surface and the image light emitting surface, wherein the light emitting device is disposed adjacent to the illumination light incident surface.

3. The light modulating module of claim 2, wherein the light emitting device comprises a light emitting diode (LED), a cold cathode fluorescent lamp (CCFL), a hot cathode fluorescent lamp (HCFL), or an exterior electrode fluorescent lamp (EEFL).

4. The light modulating module of claim 2, wherein the light guide device further comprises a plurality of microstructures disposed on the image light incident surface.

5. The light modulating module of claim 4, wherein the plurality of microstructures comprise a plurality of dots having a distribution density increasing along a direction away from the illumination light incident surface.

6. The light modulating module of claim 1, wherein the image light modulating device comprises a reflective polarizer disposed on the plane light source, wherein the reflective polarizer is capable of substantially reflecting an image light beam having a first polarization state and substantially transmitting an image light beam having a second polarization state, wherein the first polarization state is different from the second polarization state.

7. The light modulating module of claim 6, wherein the reflective polarizer comprises a wire grid polarizer comprising a substrate, and a wire grid disposed on the substrate, wherein the wire grid comprises a plurality of wires aligned in parallel, and the plurality of wires comprise an electrically conductive material.

8. The light modulating module of claim 7, wherein the electrically conductive material comprises a metal.

9. The light modulating module of claim 8, wherein the metal comprises at least one of aluminum, silver, and gold.

10. The light modulating module of claim 7, wherein at least one of the plurality of wires comprises a nanometer-sized wire.

11. The light modulating module of claim 6, wherein the reflective polarizer comprises a linear reflective polarizer or a circular reflective polarizer.

12. The light modulating module of claim 6, wherein the image light modulating device further comprises a fractional wave plate disposed on the reflective polarizer.

13. The light modulating module of claim 12, wherein the fractional wave plate comprises a quarter wave plate or a half wave plate.

14. The light modulating module of claim 1, wherein the image light modulating device comprises a reflective polarizer disposed on the plane light source, wherein the reflective polarizer comprises a first portion and a second portion, wherein the first portion is capable of substantially reflecting the image light beam having a first polarization state and substantially transmitting the image light beam having a second polarization state, and the second portion is capable of substantially reflecting the image light beam having the second polarization state and substantially transmitting the image light beam having the first polarization state.

15. The light modulating module of claim 1, wherein the image light modulating device comprises a light directing device disposed on the plane light source, wherein the light directing device is capable of refracting the image light beam to either a left or right eye of the viewer after the image light beam passes through the light directing device.

16. The light modulating module of claim 15, wherein the light directing device comprises a lenticular film having a plurality of microlenses, a plurality of prisms, or a plurality of cylinders.

17. The light modulating module of claim 15, wherein the light directing device comprises an adjusting unit, a first electrode, a second electrode, and a plurality of variable lenses formed by a birefringence polar fluid, wherein the plurality of variable lenses are capable of modulating the direction of the image light beam as an arrangement of the birefringence polar fluid is modulated by adjusting a driver voltage from a driver source applied to the first electrode and the second electrode, and the image light beam is capable of being emitted to either a left or right eye of the viewer.

18. The light modulating module of claim 17, wherein the birefringence polar fluid comprises a liquid crystal element.

19. The light modulating module of claim 17, wherein the light directing device further comprises an alignment layer capable of aligning the birefringence polar fluid.

20. The light modulating module of claim 1, wherein the light source portion is disposed on the image light modulating device, and the image light modulating device is disposed between the light source portion and the reflective display apparatus.

21. The light modulating module of claim 20, wherein the image light modulating device comprises a reflective polarizer disposed on the reflective display apparatus, wherein the reflective polarizer comprises a first portion and a second portion, wherein the first portion is capable of substantially reflecting the image light beam having a first polarization state and substantially transmitting the image light beam having a second polarization state, and the second portion is capable of substantially reflecting the image light beam having the second polarization state and substantially transmitting the image light beam having the first polarization state.

22. The light modulating module of claim 21, wherein the image light modulating device further comprises an angular adjustable reflective polarizing device disposed on the reflective polarizer, wherein the angular adjustable reflective polarizing device comprises a plurality of the switchable light modulating cells, wherein each of the plurality of the switchable light modulating cells comprises a polarizer, a first electrode, a second electrode, a compartment, and a first and second light modulating media filled in the compartment wherein the first light and second light modulating media are substantially immiscible and are of different refractive indices, wherein the polarizer is on a boundary between the first light and second light modulating media and is capable of adjusting with a variation of the boundary between the first light and second light modulating media driven by voltage difference among the first and second electrodes.

23. The light modulating module of claim 22, wherein the polarizer comprises a multilayer stack of alternating layers comprising a first material and a second material.

24. The light modulating module of claim 22, wherein the polarizer is capable of substantially reflecting an image light beam having a first polarization state and substantially transmitting an image light beam having a second polarization state, wherein the first polarization state is different from the second polarization state.

25. The light modulating module of claim 22, wherein the compartment of the switchable light modulating cell comprises a partition wall disposed between the two adjacent switchable light modulating cell, and wherein the light source portion is disposed on the partition wall, and the light source portion comprises a plurality of light transparent windows respectively corresponding to each of the plurality of the switchable light modulating cells, wherein each of the plurality of light transparent windows comprises a light transparent portion and a frame comprising an absorber and a reflection portion disposed between the absorber and the partition wall, wherein an ambient light is capable of entering the switchable light modulating cell by passing the light transparent portion of the light transparent window.

26. The light modulating module of claim 21, wherein the image light modulating device further comprises a transparent substrate disposed on the reflective polarizer and a micro electro mechanical system device disposed on the transparent substrate, wherein the micro electro mechanical system device comprises a moveable optical element and an actuator, wherein the moveable optical element is actuated by the actuator and is capable of being held at any one of a plurality of positions.

27. The light modulating module of claim 26, wherein the moveable optical element comprises a polarizer capable of substantially reflecting a light having a first polarization state and substantially transmitting light having a second polarization state, wherein the first polarization state is different from the second polarization state, wherein a motion of the polarizer is controlled by the actuator.

28. The light modulating module of claim 27, wherein the polarizer comprises a multilayer stack of alternating layers comprising a first material and a second material.

29. A stereoscopic display module adapted to be applied to a reflective display apparatus, comprising:
  the light modulating module of claim 1; and
  a stereoscopic glasses comprising a right eye glass capable of transmitting the image light beam having a first polarization state and a left eye glass capable of transmitting the image light beam having a second polarization state, wherein the first polarization state is different from the second polarization state,
  wherein the image light beam is emitted to either a left or right eye of a viewer to form an auto stereoscopic image perceivable to the viewer after the image light beam is emitted out from the image light modulating device and passes through the stereoscopic glasses.

30. An image display system, comprising:
  a reflective display apparatus, comprising a display panel having a plurality of pixels; and a light modulating module, disposed on the reflective display apparatus, comprising a light source portion capable of providing an illumination light beam, wherein the illumination light beam is capable of being transmitted to the reflective display apparatus, and the reflective display apparatus is adapted to reflect the illumination light beam to generate an image light beam;

an image light modulating device disposed above the reflective display apparatus and disposed in a light path of the image light beam, wherein the image light modulating device is capable of modulating at least one of the direction and the polarity of the image light beam; and a stereoscopic glasses comprising a right eye glass capable of transmitting the image light beam having a first polarization state and a left eye glass capable of transmitting the image light beam having a second polarization state, wherein the first polarization state is different from the second polarization state, wherein the image light beam is emitted to either a left or right eye of a viewer to form an auto stereoscopic image perceivable to the viewer after the image light beam is emitted out from the image light modulating device and passes through the stereoscopic glasses, wherein the light source portion comprises a plane light source and is disposed between the image light modulating device and the reflective display apparatus.

* * * * *